Patented Dec. 29, 1931

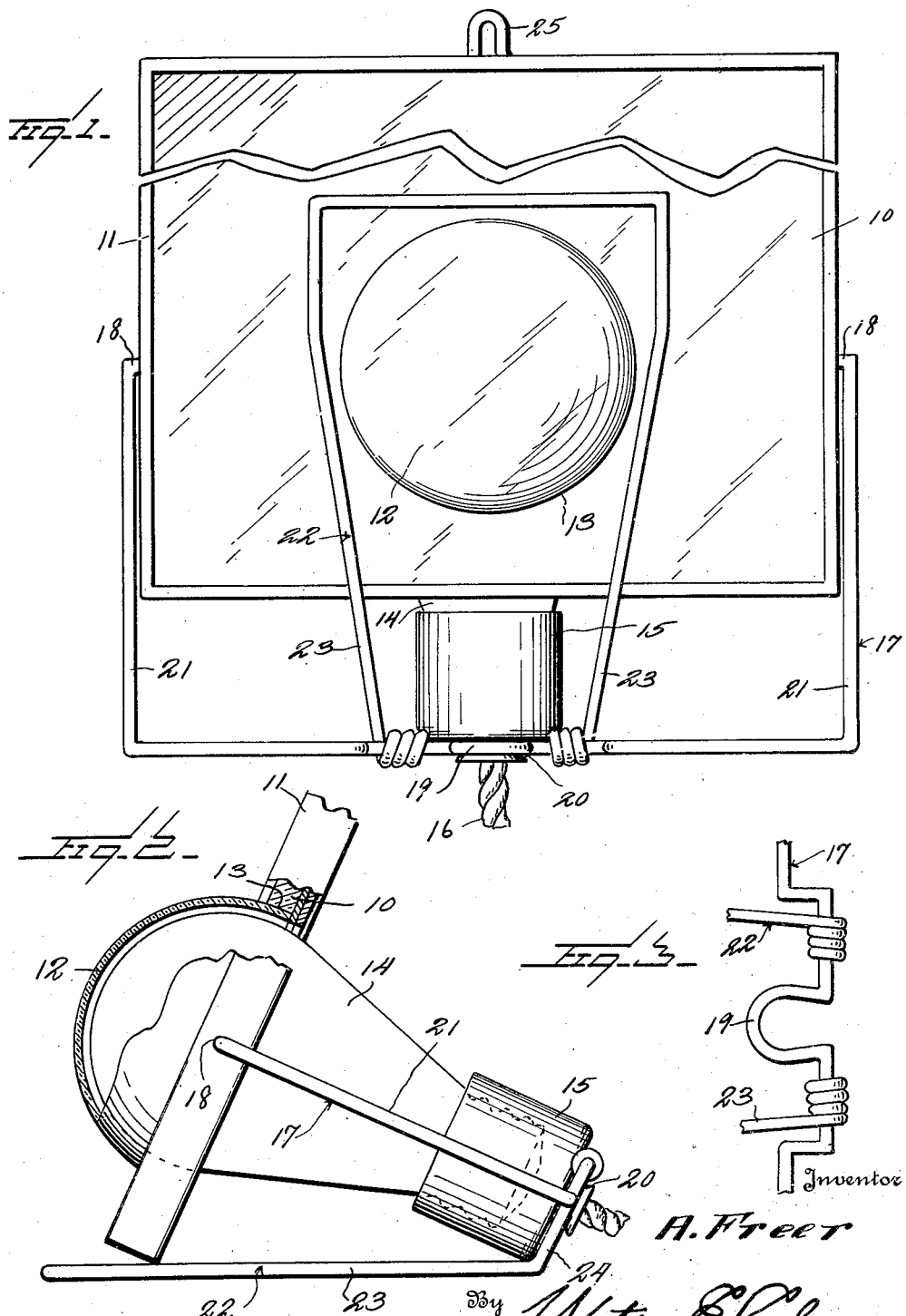

1,839,146

UNITED STATES PATENT OFFICE

ALBERT FREER, OF WOODMERE, NEW YORK

ILLUMINATED MIRROR

Application filed October 4, 1930. Serial No. 486,465.

The present invention relates to vanity mirrors or the like and more particularly to an illuminated mirror.

An object of this invention is to provide a mirror of this kind which is so constructed that it may be positioned on a horizontally disposed supporting member in the form of a table or the like and which may also be supported from an outstanding bracket secured to a wall or the like.

Another object of this invention is to provide a device of this kind which may be folded into a relatively small and compact device so as to occupy a relatively small amount of space.

A further object of this invention is to provide a device of this kind wherein the mirror may be inclined at any desired angle.

The above and various other objects and advantages of this invention will in part be described and in part be understood from the following detailed description of the present preferred embodiment, the same being illustrated in the accompanying drawings wherein:—

Figure 1 is a detail fragmentary front elevation of a device constructed according to the preferred embodiment of this invention;

Figure 2 is a fragmentary side elevation partly in section of the device showing the manner in which the device is used on a horizontal supporting member, and Figure 3 is a fragmentary detail view showing the manner of securing the supporting base to the socket supporting member.

Referring to the drawings wherein like numerals of reference designate corresponding parts throughout the several views, the numeral 10 designates generally a mirror which is mounted in a frame 11, the frame 11 being preferably of metal construction. However, I do not wish to be limited to this construction of the frame 11 as it may be constructed of other material than metal.

The mirror 10 is provided at the desired point in the surface thereof and preferably adjacent the bottom with an aperture 13 in which is mounted a convex member 12, the convex member 12 being preferably constructed of glass and having one surface therof frosted. The convex member 12 is of a configuration so as to substantially surround the enlarged end of an electric bulb 14, the bulb 14 being positioned in a socket 15, and connected by means of an electric cord 16 to an electric circuit.

A swingable U shaped member 17 which is provided at the free ends thereof with inwardly extending lugs 18 which engage the frame 11 is mounted in the frame 11 adjacent the lower edge portion thereof. The U shaped member 17 is provided intermediate the ends thereof with a looped portion 19 which is adapted to engage about a grooved member 20 which is secured to the socket 15.

The socket 15 is preferably positioned in substantial alignment with the longitudinal axis of the free arms 21 of the U shaped member 17. A supporting bracket or base member generally designated as 22 is secured at the free ends thereof about the U shaped member 17, the free arms 23 of the rockable supporting member 22 being twisted about the U shaped member 17 on the opposite sides of the grooved member 20. The supporting member 22 is longitudinally bent as at 24 so as to position the body of the U shaped member 22 at an angle with respect to the axis of the light bulb and socket. The upper edge of the supporting member 22 is adapted to be engaged by the lower edge of the frame 11 so as to support the frame 11 in angular position with respect to the horizontal, the supporting member 22 constituting a base for holding the mirror 10 and the frame 11 in angular position with respect to the horizontal.

The frame member 11 is also provided at the upper edge portion thereof with a loop or eye member 25 which is adapted to engage a nail or other supporting member which is mounted in outstanding relation to the vertical or to a vertically disposed wall.

The device as shown in Figure 2 is adapted to be mounted on a dressing table or the like for use in "make up" work. When the device is mounted in depending relation on the supporting loop 25 it may be used for shaving operations or the like, the mirror 10 being positioned in vertical position. In this position, the supporting base member 22 is positioned in depending relation to the frame 17.

When the light bulb 14 is mounted in the socket 15 and the device mounted in operative position, the light bulb 14 is positioned at substantially right angles to the plane of the mirror 10 and a considerable portion of the light rays are projected through the convex transparent member 12. While it is of course understood that a portion of the light rays from the bulb 14 will be projected onto the rear of the mirror 10, a sufficient quantity of rays may be projected through the convex member 12 so as to illuminate the face of an individual positioned closely adjacent thereto.

The frame member 17 together with the supporting base 22 are preferably constructed of relatively rigid but at the same time resilient material in the form of wire or the like and, if desired, a suitable covering in the form of rubber or the like may be positioned about the periphery of the base member 22 so that when the lower edge of the frame 11 engages the upper surface of the base 22, the lower edge will not slip thereupon and the bottom of the base 22 will not scratch or otherwise mar the surface upon which it is positioned.

It will be obvious from the foregoing that a relatively simple, practical and foldable illuminated mirror has been devised and that various changes and modifications may be made in the details of construction and design of the above specifically described embodiment of this invention without departing from the spirit thereof, such changes and modifications being restricted only by the scope of the following claims.

What is claimed is:—

1. A vanity mirror of the character described comprising in combination, a mirror, a frame positioned about the marginal edge portions of the mirror, said mirror having a circular opening therethrough, a convex member positioned in said opening and extending outwardly of the front face of the mirror, a light socket, a swingable light socket supporting member mounted in the frame, a light globe positioned in said socket and cooperating with said light socket supporting means whereby to maintain a portion of said globe within said convex member while said socket is swung rearwardly of the mirror, and a supporting base member secured to said light socket supporting means and cooperating with the frame whereby to hold the mirror in adjusted position.

2. A vanity mirror of the character described comprising in combination, a mirror, a frame positioned about the marginal edge portions of the mirror, said mirror having a circular opening therethrough, a convex member positioned in said aperture, a light socket, a U shaped supporting frame swingably mounted on said first frame and engaging said socket, a light globe mounted in said socket and having one end thereof disposed in said convex member, said supporting frame cooperating with said light socket whereby to maintain said light globe coaxial with said convex member, and a U shaped base member swingably mounted on said light socket supporting member and cooperating with the frame whereby to maintain the mirror in angularly disposed position.

3. A vanity mirror of the character described comprising in combination, a mirror, a frame positioned about the marginal edge portions of the mirror, said mirror having a circular aperture therethrough, a convex member disposed through said aperture and extending outwardly of the front face of the mirror, a light socket, a U shaped supporting member engaging said light socket and swingably mounted on said frame, a light globe positioned in said socket and having one end thereof disposed in said convex member and a looped member positioned adjacent one end of said mirror whereby to support said mirror in vertically disposed position.

In testimony whereof I hereunto affix my signature.

ALBERT FREER.